(12) United States Patent
McCormack et al.

(10) Patent No.: US 7,936,646 B2
(45) Date of Patent: May 3, 2011

(54) SPHERICAL ABERRATION COMPENSATION ADJUSTMENT

(75) Inventors: James Joseph Anthony McCormack, Eindhoven (NL); Alberto Martin-Consuegra Granados, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 266 days.

(21) Appl. No.: 12/377,150

(22) PCT Filed: Jul. 24, 2007

(86) PCT No.: PCT/IB2007/052944
§ 371 (c)(1),
(2), (4) Date: Feb. 11, 2009

(87) PCT Pub. No.: WO2008/020354
PCT Pub. Date: Feb. 21, 2008

(65) Prior Publication Data
US 2010/0177611 A1 Jul. 15, 2010

Related U.S. Application Data

(60) Provisional application No. 60/822,398, filed on Aug. 15, 2006.

(51) Int. Cl.
*G11B 7/00* (2006.01)
(52) U.S. Cl. .................................................. 369/44.23
(58) Field of Classification Search ................ 369/44.23
See application file for complete search history.

(56) References Cited

U.S. PATENT DOCUMENTS

| | | | |
|---|---|---|---|
| 7,142,497 B2 * | 11/2006 | Hirai | 369/112.17 |
| 7,406,007 B2 * | 7/2008 | Kuze et al. | 369/44.32 |
| 7,848,209 B2 * | 12/2010 | Hirai | 369/112.16 |
| 2004/0017743 A1 | 1/2004 | Sasaki et al. | |
| 2004/0100879 A1 | 5/2004 | Ogasawara | |
| 2004/0151088 A1 | 8/2004 | Kuze et al. | |
| 2004/0190417 A1 | 9/2004 | Watanabe et al. | |
| 2004/0246864 A1 | 12/2004 | Kobayashi et al. | |
| 2005/0094535 A1 | 5/2005 | Yanagawa | |
| 2005/0122878 A1 | 6/2005 | Baba | |
| 2005/0152258 A1 | 7/2005 | Komma et al. | |
| 2006/0140072 A1 * | 6/2006 | Sato et al. | 369/44.23 |
| 2006/0164949 A1 | 7/2006 | Sagara et al. | |
| 2006/0221782 A1 | 10/2006 | Kanenaga | |
| 2007/0097809 A1 * | 5/2007 | Miyaoka | 369/44.23 |
| 2008/0232207 A1 * | 9/2008 | Tukker et al. | 369/44.33 |

FOREIGN PATENT DOCUMENTS

| | | |
|---|---|---|
| EP | 1357548 A2 | 10/2003 |
| EP | 1385158 A2 | 1/2004 |
| EP | 1551016 A2 | 7/2005 |
| EP | 1589529 A2 | 10/2005 |
| EP | 1385156 B1 | 11/2006 |
| JP | 2004062937 | 2/2004 |
| JP | 2004241080 | 8/2004 |
| WO | 2006070329 A2 | 7/2006 |

* cited by examiner

*Primary Examiner* — Mark Blouin

(57) ABSTRACT

Spherical aberration correction is provided for CD writing in a double (CD+DVD), triple (CD+DVD+BD) or quadruple (CD+DVD+BD+HD-DVD) writer, which use the same light path for CD and DVD. In an optical drive that uses numerous laser wavelengths combined into one light path each wavelength having a different numerical apertures a correction for spherical aberration is made to correct for effective numerical apertures of the light path that becomes shifted up from the original value to higher values. The correction in spherical aberration removes that effect of the higher effective NA and defects, particularly in writing, are corrected.

20 Claims, 2 Drawing Sheets

SPHERICAL ABERRATION COMPENSATION ADJUSTMENT

The present invention relates to compensating for deviations in light spot quality on optical discs, and more particularly to compensating for spherical aberrations caused by using numerical apertures that are les than optimum.

Optical discs use light of a predetermined wavelength from a laser diode read and write information to and from an optical disc. Light reflected from the optical disc is used to control focusing, tracking and laser power characteristics. A problem that can occur in the light beam focused on the disc is that the amount of spherical aberration of the spot is too large for optimal recording. Spherical aberration can be caused by various reasons including: mismatches between the objective lens design and the actual cover layer thickness of the disc. The mismatch can be cancelled by adapting the properties of the optics resulting in an optimal spot for recording. Blu-ray optical systems include a spherical aberration (SA) compensation servo to correct for spherical aberrations. The SA-servo can be implemented with collimating optics, or LC-cell, or telescope optics. In order to write with optimum quality on Blu-ray Discs (BD) it is important to tune the spherical aberration (SA) compensation servo in the BD-drive.

Spherical aberrations occur more predominantly in optical disc systems that have shorter focal lengths and higher numerical apertures. Spherical aberrations can also result from various layers in optical discs. For example, a new standard in optical discs is the Blu-ray standard that employs a large numerical aperture, short focal length and multiple recording layers. The Blu-ray standard provides highly desirable features such as extremely high density recording. It is also very desirable that Blu-ray readers and writers be capable of using older standards such as CDs and DVD.

Currently, optical drives employ technologies that use numerous wavelengths to accommodate different types of optical discs that will be used with an optical drive. Each of these different wavelengths will, typically, employ a different numerical aperture (NA). It is a common practice to have the varying laser wavelengths each using different numerical apertures to share a common set of optics combined into a single light path. Examples of such writers are double, triple, and quadruple writers that can operate on various combinations of CD, DVD, BD and HD-DVD compatible discs. These double, triple, and quadruple writers have, commonly, made concessions with the laser color having the lowest NA in order to attain sufficient beam power. The laser color having the lowest NA is typically the longest wavelength laser that is used, which is generally that used for CDs. The resulting effective NA for the longest wavelength laser used (typically 780 nm infra-red used for CDs) results in the light-path being shifted up from the original value to a higher value (e.g. approaching for example DVD values). A direct result of this higher effective NA in using CDs is a higher sensitivity to spherical aberration (SA) defects, particularly, during writing where the absolute beam-power rather than just the signal to noise ratio (SNR) is important. Therefore, in situations wherein a higher effective NA light path occurs, an SA correction will yield a performance gain for CD. Also, in situations where a higher effective NA light path occur does not result (such as "normal" CD or Dual CD/DVD writers) an SA correction will not yield a performance gain for CD.

For the specific case of CDs, it is known that significant variations can occur within the substrate thickness in commercially marketed discs. Significant as used in this context refers to that fact that an SA correction for CDs in the drive yields better writing performances. In the DVD case, the NA change may be more limited but the sensitivity of the system to SA is already higher and moreover Dual Layer discs are built (in normal DVD systems) with an allowed SA error. Thus, the loss in margin can be regained by applying a SA correction to DVD discs.

Therefore, there exists a problem in prior art systems in which CD/DVD writing is highly sensitive to SA errors for the above stated reasons (such as using BD triple writer). These prior art systems cannot write to CDs or DVDs correctly with sufficient margins for robustness. This problem is especially true at higher speeds (i.e. powers) and across all ranges of disc tilts and thickness variations. This is a serious shortcoming affecting basic product performance.

Embodiments provided herein address the above discussed shortcoming in the prior art by providing spherical aberration (SA) adjustment. The SA adjustment provided is particularly useful for writing to CDs, but these embodiments are also useful for DVDs. A CD/DVD system that reads and writes with SA correction is provided. Measurements used for SA correction are taken in terms of measured jitter during reading. SA correction is made and used during writing. Writing systems such as triple, quadruple writers perform SA correction with the system electronics that exist for BD. The sensitivity of CD and DVD to the SA correction is high enough in these triple, quadruple writers to allow reliable optimization using jitter as a suitable quality function. Furthermore, the sensitivity of writing is such that optimizing SA leads to an improved writing performance with higher margins.

Spherical aberration (SA) correction is provided for CD writing in a double (CD+DVD), triple (CD+DVD+BD) or quadruple (CD+DVD+BD+HD-DVD) writer, which use the same light path for CD and DVD.

Figure 1:
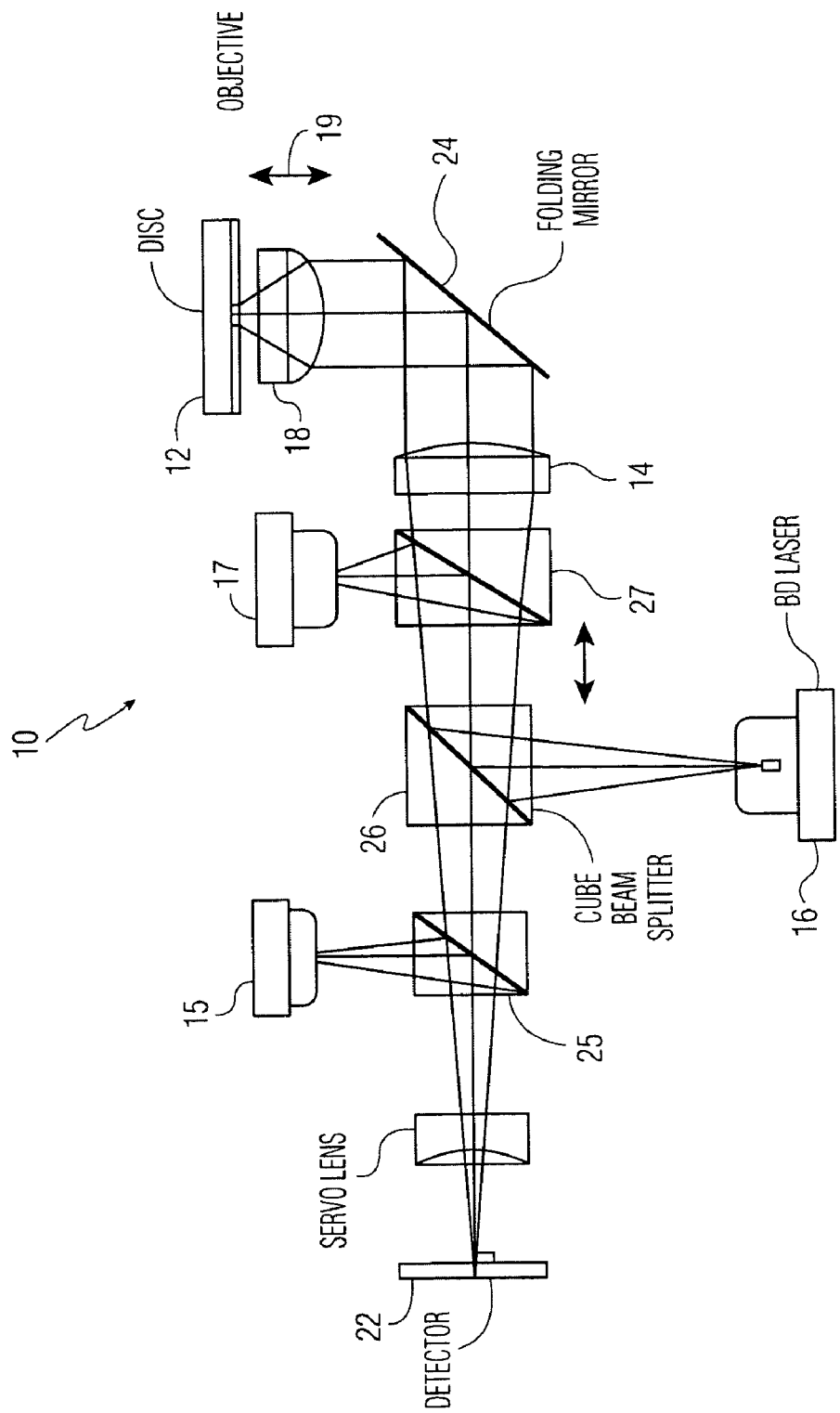
FIG. 1 is a schematic diagram of a multiple light optical reader/writer system.

FIG. 1 is a schematic view of optical system 10 of the type used within in a BD-drive that employs a moving collimator lens (collimator) 14. FIG. 1 is illustrative of the type of optical system 10 employed within the drives used to read and record a Blu-ray disc 12. It should be understood that the system 10 shown in FIG. 1 is an illustration of an embodiment but that other embodiments are also envisioned. For example, these are no HD-DVD laser illustrated in FIG. 1, but embodiments using the HD-DVD are clearly envisioned.

In a Blu-ray system as illustrated in FIG. 1a, a 450 nm light emanates from Blu-ray laser 16 which has a substantial portion reflected from beam splitter 26 through collimator lens 14. The collimator lens 14 takes the light incident from the beam splitter 26 and forms parallel light that is incident upon mirror 24. Mirror 24 reflects the parallel light towards objective lens 18; which focuses the light beam upon disc 12. Light reflected from disc 12 is formed into parallel light by objective lens 18. The focal position of objective lens 18 is controlled by focus offset servo 19. Light reflected from the disc passes through objective lens 18 and is reflected by mirror 24 through collimator lens 14. The reflected lightbeam that passes through collimator lens 14 converges towards beam splitter 26 which passes a substantial portion to servo lens 22 and onto detector 22.

Still referring to FIG. 1, additional lasers 15, 17 emit light of a different wavelength than Blu-ray laser 16 and also have has a substantial portion reflected from beam splitters 25, 27, respectively through collimator lens 14. The additional lasers

15, 17 emit light of a wavelength for infra-red and red that are used for CDs and DVDs, respectively. The placement of additional lasers 15, 17 as shown in FIG. 1 is only an example. The configuration in FIG. 1 is used as an example for the purpose of discussing the embodiments disclosed herein. The collimator lens 14 takes the light incident from beam splitters 25, 27 and forms parallel light that is incident upon mirror 24. Mirror 24 reflects the parallel light towards objective lens 18; which focuses the light beam upon disc 12. Light reflected from disc 12 is formed into parallel light by objective lens 18. The focal position of objective lens 18 is controlled by focus offset servo 19. Light reflected from the disc passes through objective lens 18 and is reflected by mirror 24 through collimator lens 14. The reflected light beam that passes through collimator lens 14 converges towards beam splitters 25, 27 which pass a substantial portion to servo lens 22 and onto detector 22.

The spot on the disc can be defocused by actuating focus offset servo 19 which move the objective lens 18 relative to the disc in the direction indicated by arrow 19. Changing the position of the collimator lens 14 by collimator servo 15 can make the light beam diverge or converge, as desired, creating at least a partially, non-parallel beam. This non-parallel beam generates additional spherical aberration in the objective lens. This adds to the spherical aberration generated by the mismatch between the objective lens 18 and the cover layer thickness of the disc.

The BD drive shown in FIG. 1 employ conventional 4-segment photo-diode detector elements are commonly used for focus-error and radial tracking-error signal generation. More complicated photo diode detector elements to measure the spherical aberration would result in an increase in costs to the system. While, it is envisioned that other photo diode detector elements can be used, this discussion herein employ conventional 4-segment detector elements without using additional detectors.

In optical disc systems that read from a ROM disc, the focus offset and SA-servo can be optimized using the jitter of the read HF-signal. However, on blank recordable discs, like BD-R, rewritable BD-RE or DVD+R, no data is available from which to generate the HF-signal. Therefore, a factory pre-set value or a value that is determined using a similar type of disc (CD or DVD) is used for initial optimization values for the focus offset and SA-servo during start-up within blank recordable and rewritable optical discs.

Conventional Blu-ray disc writing systems do not guarantee the presence of an HF-signal. These currently available Blu-ray writing systems typically employ a push-pull methodology for SA-servo optimization. A common practice is to optimize the SA-servo during start-up by measuring the Push-Pull amplitude or Push-Pull power. Push-pull optimization results in a setting that is sufficiently accurate to enable further optimizations.

In an optical drive having multiple laser wavelengths using different numerical apertures (NA's) combined into one light path (e.g. double, triple, quadruple writers etc.), it is common that concessions must be made with the laser colour of lowest NA in order to attain sufficient beam power. The laser colour with the lowest NA is generally the laser emitting the longest wavelength, almost always CD. What can then occur is that the effective NA of the CD light-path shifts up from the original value to higher values (e.g. approaching for example DVD values). A direct effect of this higher effective NA is a higher sensitivity to SA (spherical aberration) defects and in particular for writing (where absolute beam-power rather than just signal SNR is important). This means that in this sort of high NA light paths that a SA correction yields a performance gain for CD, which is not the case in "normal" CD or Dual (CD/DVD) writers. For the specific case of CD, it is known that significant substrate thickness variations can occur in commercial market discs. Significant in this context means that a SA correction per disc in the drive will yield a better writing performance. In the DVD case, the NA change may be more limited but the sensitivity of the system to SA is already higher and specifically Dual Layer discs are built (in normal DVD systems) with an allowed SA error. This loss in margin can be regained by applying a SA correction to these discs.

Conventionally, there is no SA adjustment that is performed during writing for CDs and DVDs, because CDs normally do not have serious sensitivity issues for SA and DVDs are designed to tolerate the errors in SA within the DVD specification. Hence, in conventional CD/DVD reading and writing systems, no SA correction mechanism exists. Therefore, no measurement for SA exists and no SA correction takes place. The closest mechanism currently existing to the measurement of SA in such systems would be jitter determination, and the resulting sensitivity would be so low that no reliable correction could be carried out. However in certain of these optical writing target systems (e.g. triple, quadruple writers) SA correction systems do exist (such as for BD) and the sensitivity of CD and DVD to the SA correction is high enough to allow for reliable optimization via jitter as a suitable quality function. Furthermore, it has been seen that the sensitivity of writing is such that optimizing SA leads to an improved writing performance with higher margins.

In an embodiment, the optimum SA correction adjustment is found by measuring jitter during the reading back of test writing in the factory. It has been found that the optimum value for reading corresponds to the optimum value for writing (as one would expect). Hence, on the basis of a read back optimization; the optimum SA for writing is created. Accordingly, this process delivers a basic optimum value that can be used for all discs of a given type (e.g. CD value for CD-R/RW).

Figure 2:
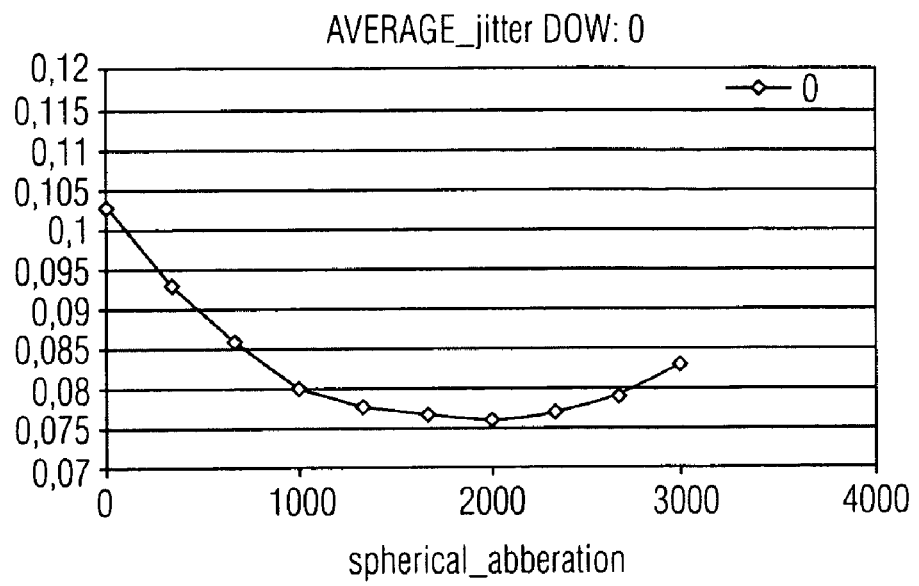
FIG. 2 is an illustration of jitter vs. spherical aberration at average speeds.
Figure 3:
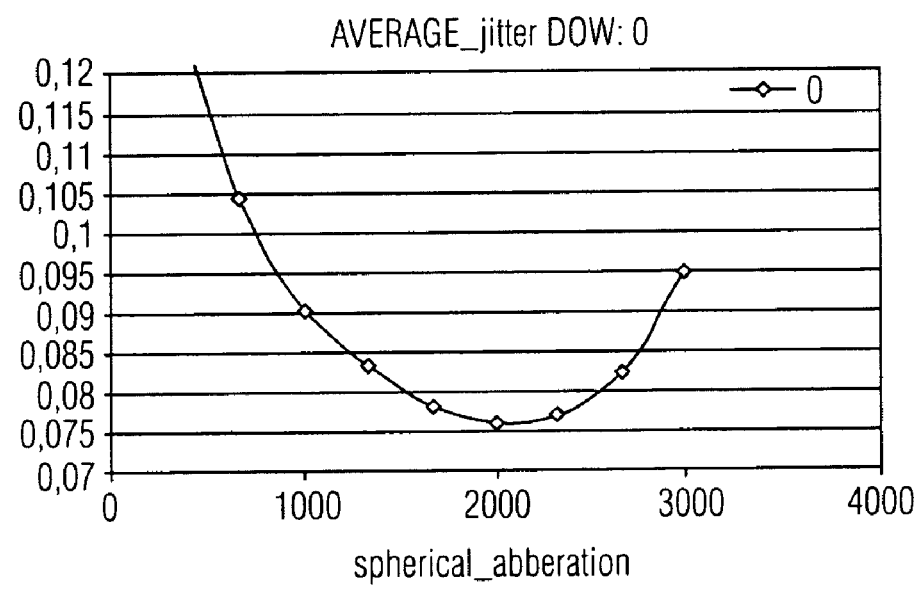
FIG. 3 is an illustration of jitter vs. spherical aberration at high speeds.

FIGS. 2 and 3 illustrate examples of measuring jitter various amounts of spherical aberration. In FIG. 2, jitter is provided as a function of spherical aberration for average speeds in a system of, or similar to, that illustrated in FIG. 1. In FIG. 2, jitter is provided as a function of spherical aberration for high speeds in a system of, or similar to, that illustrated in FIG. 1.

In another embodiment, the optimum SA correction adjustment is found by measuring jitter during read back in the drive itself at start-up and/or Optimum Power Calculation (OPC). This delivers an accurate correction for a disc that is matched to the given drive.

The system employs a mechanism such as a conventional SA correction actuator using known methodologies.

The system in compatible with CD/DVD R/RW types of optical discs. These CD/DVD R/RW types of optical discs have varying substrate thicknesses. These variations in the thickness of substrates effectively create varying SA aberrations that affect the effective writing power. The discs with the largest thickness variations across the disc create the largest amount in variations in SA aberrations. The read performance of the discs and in particular jitter in determined. The SA correction actuator is adjusted so that the jitter during reading is within a predetermined range. This range would be in the vicinity of the lowest jitter. Using iterative reads at various values of SA correction, the results shown in FIGS. 2 and 3 can be achieved using existing system electronics and optics. The optimum values for SA correction are those values having the lowest amount of jitter. During writing to these discs, the system adjusts the SA correction actuator to the same predetermined range that was determined during reading for the lowest amount of jitter. The same SA correction determined during reading by observing the jitter is used for writing.

The drive signals to the SA correction actuator will have a signal before or during writing that changes the actuator setting. The signal would generally be in the form of a on the SA actuator during start-up or OPC procedures.

In an embodiment, a CD/DVD disc is placed in the drive, and the speed has been set. Initially, the disc is checked for any written data. This occurs in disc start-up.

If data has already been written to the disc, then that data can be read. During reading of the data, a number of different SA-correction values are used and the jitter is measured for that data read using the SA-correction values. For robustness, this is done in two stages: (1) adjusting in steps away from the nominal adjusted position (as determined at the factory or previously determined) in one direction; and then (2) adjusting in steps away from the nominal adjust position in the other direction.

This action leads to raw jitter values that can be used to produce a second order curve as shown in FIGS. 2 and 3. The minimum value (the point closest to the spherical aberration axis) of this curve can be used to identify the optimum SA correction value for that disc and also the optimum reading/writing speed. It is worth noting that the read SA correction curve is generally wider than the correction curve used for writing due to the effect of main-beam power loss from the optimum values in addition to the spot aberration effects valid for both reading and writing.

If the disc is completely unwritten, then the factory SA correction value is applied. If it is desired to find a more accurate value of SA for the actual writing (e.g. in the above case of an unwritten disc), then the optimum power control (OPC) can be performed using the setting found or used after start-up. Then the SA correction measurement process is repeated on the part of the OPC where test-data at optimum power was written. This will yield an optimum value for SA correction that can be used for that disc on that drive.

Another embodiment provides for improved writing across the disc could by applying varying SA correction values during calibration management breaks. During periods of constant angular velocity (CAV), the varying SA correction values will yield very good optimized results. This strategy could be different for CD and DVD type discs, as calibration management in CD implies a seamless link which is not as robust as DVD linking (part of the standard). Additionally, DVD sensitivities are higher, particularly DL (dual layer) with spacer variations; therefore, there is sufficient reason to apply it for DVD.

Finally, it is possible that systems exist where read and write SA correction optima do not coincide. The way around this problem is to always make use of the additional OPC measurement step (as described above).

The foregoing embodiments can be employed to optical writing systems and high speed writing systems. The foregoing embodiments can be used individually or in combination for optical writing systems that use CDs, DVDs, BD and HD-DVDs writing systems. Infra-red is the color used by CDs, Red is used by DVDs, Blue is used by Blu-ray Discs BD and red is also used by HD-DVDs).

The foregoing embodiments can be used individually or in combination for optical writing systems including, but not limited to: double writers that use either blue or red with infra-red; triple writers that use blue, red and infra-red; or quadruple writers that use blue, with red (for DVD and HD-DVD) and infra-red.

The foregoing description details the embodiments most preferred by the inventor. Variations of these embodiments will be readily apparent to those skilled in the art, therefore the scope of the invention should be measured by the appended claims.

The invention claimed is:

1. A method for correcting spherical aberration in optical writing systems that employs multiple light sources having different wavelengths traversing a same light path comprising:
   reading data from an optical disc while iteratively altering correction settings for spherical aberrations;
   measuring jitter for each iteration;
   selecting an optimum setting for spherical aberration correction; and
   implementing the optimum setting for writing.

2. The method of claim 1 wherein the step of reading alters correction settings for spherical aberrations in a predetermined manner.

3. The method of claim 2 wherein the step of reading further comprises reading at an average speed of the optical disc.

4. The method of claim 2 wherein the step of reading further comprises reading at a high speed of the optical disc.

5. The method of claim 2, wherein the step of measuring further comprises measuring jitter in the predetermined manner used for reading on a one to one basis blocks and storing the average number of ECC corrections on the optical media.

6. The method of claim 2, wherein the step of reading alters correction settings for spherical aberrations in the predetermined manner by starting reading at a predetermined amount of spherical correction and proceeds iteratively reading while altering spherical correction for a predetermined range.

7. The method of claim 6, wherein the step of reading alters correction settings for spherical aberrations in the predetermined manner by starting reading at the predetermined amount of spherical correction and proceeds iteratively reading while altering spherical correction for the predetermined range and then proceeds iteratively reading at the predetermined amount of spherical correction while altering spherical correction for another predetermined range in an opposite direction to the predetermined range.

8. The method of claim 1 wherein selecting the optimum setting for spherical aberration correction includes selecting a smallest amount of measured jitter.

9. The method of claim 1 wherein selecting the optimum setting for spherical aberration correction includes selecting a range small amounts of measured jitter.

10. The method of claim 1 wherein selecting the optimum setting for spherical aberration correction includes selecting the optimum setting for spherical aberration correction to be used for correction of light having an infra-red wavelength.

11. A system that corrects spherical aberration that occurs in optical writing systems having a light path that is traversed by different wavelengths, including:
    an optical system having a plurality of lights sources of different wavelengths that emit lights that traverses the light path;
    a reading system configured to perform multiple reads of data from an optical disc, while iteratively changing setting for spherical aberration correction;

a processing device programmed to measure spherical aberration and determine an optimum spherical aberration correction setting from the iterations of data read; and a writing system to write data to the optical disc using the optimum spherical correction setting.

12. The system of claim 11, wherein the reading system is configured to alter correction settings for spherical aberrations in a predetermined manner.

13. The system of claim 11, wherein the reading system is configured to read at an average speed of the optical disc.

14. The system of claim 1, wherein the reading system is configured to read at a high speed of the optical disc.

15. The system of claim 12, wherein the processing device is programmed to measure spherical aberration by measuring jitter in the predetermined manner.

16. The system of claim 12, wherein the reading system alters correction settings for spherical aberrations in the predetermined manner by starting reading at a predetermined amount of spherical correction and proceeds iteratively reading while altering spherical correction for a predetermined range.

17. The system of claim 16, wherein the reading system alters correction settings for spherical aberrations in the predetermined manner by starting reading at the predetermined amount of spherical correction and proceeds iteratively reading while altering spherical correction for the predetermined range and then proceeds iteratively reading at the predetermined amount of spherical correction while altering spherical correction for another predetermined range in an opposite direction to the predetermined range.

18. The system of claim 10, wherein the processing device determines the optimum spherical aberration correction setting from the iterations of data read selecting the optimum setting for spherical aberration correction includes selecting a smallest amount of measured jitter.

19. The system of claim 10, wherein the processing device determines the optimum setting for spherical aberration correction by selecting a range for small amounts of measured jitter.

20. The system of claim 10, wherein the processing device determines the optimum setting for spherical aberration correction for light having an infra-red wavelength.

* * * * *